Sept. 23, 1958 W. C. CARL ET AL 2,853,666
MOTOR CONTROL APPARATUS
Filed July 11, 1955 6 Sheets-Sheet 4

United States Patent Office 2,853,666
Patented Sept. 23, 1958

2,853,666
MOTOR CONTROL APPARATUS

Wellington C. Carl, Wilkinsburg, Pa., and Earl C. Rhyne, Park Forest, Ill., assignors to Westinghouse Electric Corporation, East Pittsburgh, Pa., a corporation of Pennsylvania Application July 11, 1955, Serial No. 521,076

9 Claims. (Cl. 318—72)

This invention relates to motor control apparatus and has particular relation to the control of so-called hoist motors which are used in raising or lowering loads such as the span or leaves of movable traffic bridges, elevators, skip hoists, slope hoists, unloading towers, conveyor drives, car dumpers, trainways, hoist and travel motions of cranes, wire drawing machines, navigation locks and gate drives. Such motors are of the polyphase type and one or more units are used as dictated by the particular load design.

It is essential that the torque and the speed of hoist motors be controllable with precision over a wide range. A hoist motor must be capable of supplying sufficient torque to lift the load at a reasonable speed. In the case of a bridge motor, the torque must be variable over a wide range because the motor must be capable of operating with different values of counterweighing and in winter weather when the bridge may be frozen and may be unbalanced by a layer of snow and ice, as well as in fair weather. A motor which raises the leaf of a bascule bridge must be capable during the raising operation of exerting countertorque braking to prevent the leaf from overhauling by reason of wind pressure exerted against it. In lowering a load, a hoist motor must also be capable of preventing the load from excessively overhauling. It is thus essential that the motors be readily controllable, so that under the proper circumstances a clockwise or counterclockwise torque of a magnitude dependent on the load conditions may be developed.

Prior art apparatus for controlling hoist motors is typified by Patent No. 2,440,319 to W. R. Wickerham which will be called here Wickerham patent. This patent discloses a motor control system including variable, or so-called saturable, inductors which are interposed between two of the supply buses and the motor terminals. The control is effected by varying the impedance of these inductors to unbalance the phase of the potentials supplied to the motor. The motor is also reversed by setting the inductors so that the phase rotation of the potentials impressed on the motor terminals corresponds to the desired direction of rotation of the motor.

The apparatus disclosed by Wickerham has been found to operate satisfactorily but it has certain disadvantages. It has been found that the heat developed in the inductors is substantial and for this reason large costly primary contactors and inductors have been found to be necessary. This has resulted in the requirement that the relay contacts in the control circuits of the inductors be large.

It is broadly an object of this invention to provide a control system for a hoist motor of the type including inductors in the operation of which the heating of the inductors shall be maintained at a minimum.

Another object of this invention is to provide a control system for a hoist motor including inductors of relatively small dimensions.

A further object of this invention is to provide a control system of low cost and relatively simple structure for a hoist motor.

An incidental object of this invention is to provide a novel magnetic amplifier circuit.

This invention arises from the realization that the excessive heating of the primary contactors, inductors, and motors of the Wickerham apparatus is caused by the fact that in this apparatus the motor is supplied with unbalanced phase potentials. The excessive heating results from the fact that because of the unbalancing, a portion of the current drawn by the inductors and the motor is used in bucking currents of opposite polarity rather than in driving the motor. When unbalanced potential is supplied to the primary or the field or stator windings of a three phase motor the field produced is circular. An unbalanced potential results in an elliptical field which may be regarded as the resultant of two component fields, one in the direction of rotation of the motor and the other in the opposite direction. The latter field results in the power loss under consideration.

In accordance with this invention, a polyphase hoist motor is supplied with balanced phase potentials which are varied to control the direction of rotation, positive or braking torque and speed of the motor, without necessitating the use of primary switches. This control may be effected manually by master switches or automatically by means of speed responsive mechanisms or limit switches or by a combination of both. Apparatus in accordance with one aspect of this invention includes two groups of inductors connected between the phase conductors of the supply and the terminals of the motor field windings. Two of the inductors of each of the groups are so connected between two of the conductors and two of the terminals of the motor as to provide for reversing the motor. The other inductors of each group are connected in parallel between the third phase conductor and the third terminal. The impedances of the inductors of each group are varied together so that balanced phase potentials are impressed on the terminals of the motor.

In accordance with a specific aspect of this invention, a novel magnetic amplifier circuit is also provided. This circuit includes a magnetic amplifier having a pair of control windings and current supply means for the amplifier which is capable of being set to supply current of either polarity. The current supply means is connected to one of the control windings through asymmetrical connections capable of conducting only the current of one polarity and to the other winding through asymmetrical connections capable of conducting current only of the other polarity. Each control winding is so wound that current of the polarity permitted to pass through it increases the output of the amplifier. Thus, a single reactor circuit capable of responding to currents of either polarity is provided.

In the practice of this invention in its comprehensive aspects this novel amplifier is connected between one of the phase conductors and one terminal of the motor. Between the other conductors and the other terminals of the motor two sets of additional magnetic amplifiers are connected in such manner that they may be set to control the magnitude and the phase rotation of the potentials supplied to the two terminals. All of the amplifiers are controlled together so that a single amplifier connected between the phase conductor and the one terminal of the motor produces the same impedance effect between this phase conductor and this terminal as is produced by the other amplifiers regardless of how they are excited. The novel amplifier thus operates as a phase balancing impedance.

The novel features considered characteristic of this invention are described generally above. The invention itself both as to its organization and its method of operation together with additional objects and advantages thereof will be understood from the following description taken in connection with the accompanying drawings, in which:

Figure 1:
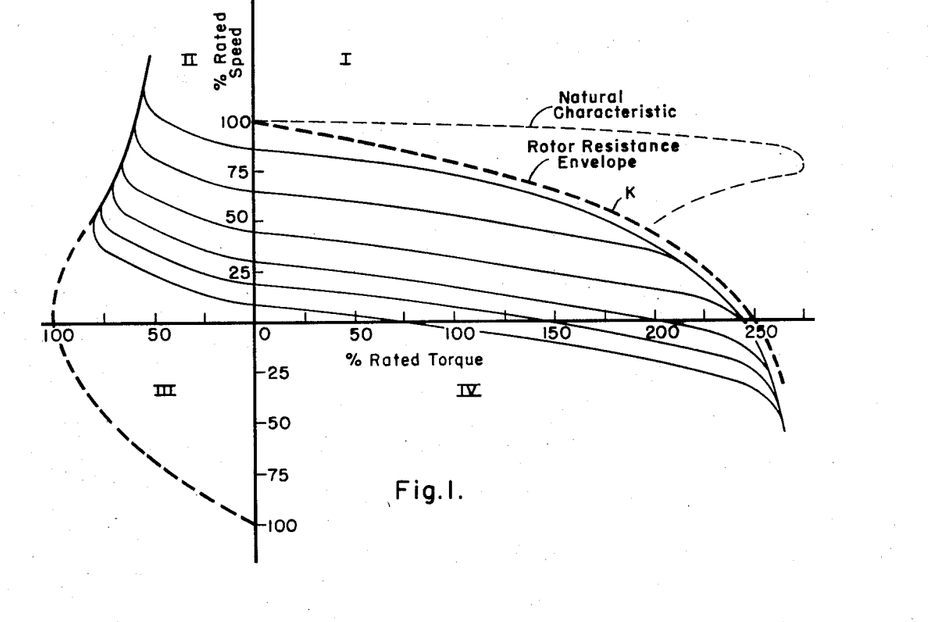
Figure 1 is a graph showing a family of speed-torque characteristics or curves of a wound rotor motor which may be obtained with apparatus in accordance with this invention; this graph is used in explaining the invention.

Preliminary to describing the invention, it may be well to discuss the manner of a motor of the type which is controlled in accordance with this invention. This discussion may be conveniently presented with reference to Fig. 1 which shows a speed-torque characteristic for a polyphase motor of the wound-rotor type. In considering this curve it should be kept in mind that the operating characteristics are affected not only by the potentials impressed on the field windings which may be regarded as the primary of a transformer but also on the resistance in series with the rotor which may be regarded as the secondary of a transformer. In Fig. 1 speed is plotted vertically in percent of the no-load shorted-rotor speed and torque is plotted horizontally in percent of the torque at rated load. The speed-torque characteristic is plotted in four quadrants which are labelled I, II, III, and IV. Quadrant I corresponds to the condition under which the motor operates directly to raise the load, or drive a load in the forward direction. In this case the speed and the torque are both positive. Quadrant II corresponds to the condition under which the load overhauls the motor in the raising or forward direction of travel and the motor applies counter-torque braking to resist the overhauling load, and/or provides retarding torque for slow down. Here the speed is positive and torque is negative. This condition corresponds to the raising of the leaf of a bascule bridge in a wind blowing in the direction of leaf movement and exerting a maximum overhauling load of approximately 50% of the full load motor torque. In the event that the overhauling torque exceeds 50% full load, the control must be such that the envelope in quadrant II is correspondingly extended in the direction of negative torque. Quadrant III corresponds to the condition in which the motor torque is applied directly to lower or reverse the direction of travel of a load. In this case both speed and torque are negative. Quadrant IV corresponds to the condition under which the motor torque is applied as counter-torque braking to resist overhauling by a load which is lowering or retarding a load to any predetermined speed. Quadrants III and IV may be symmetrical with respect to quadrants I and II if dictated by the drive.

The light broken line curve is the so-called natural characteristic of the wound rotor induction hoist motor. This curve is produced by plotting the speed as a function of the torque with the rotor short circuited. The heavy broken line curves are envelopes which determine the limiting speed-torque characteristics with a given amount of resistance in the motor rotor circuit predetermined to suit the particular application. The family of full line curves correspond to different voltages set by the voltage comparator of the apparatus (tap 165, divider V, Fig. 2; 285, VM, Fig. 6; 485, V1, Fig. 7; 615, VM1, Fig. 9). The actual speed at which a motor will run; that is the speed coordinate on the curves; is determined by the difference between the comparator potential and the counterpotential developed across the speed responsive device of the apparatus (tachometer T). The speed in any direction may be increased by increasing the comparator potential for that direction. The curves of Fig. 1 are plotted for the phase rotation of the supply which is impressed to rotate the motor in the direction to raise the load. Similar curves may be plotted for phase rotation impressed to rotate the motor in the lowering direction.

Each curve of the family represents possible master switch points and intersects the torque axis at a point called the break-away or starting torque and the speed axis at a point called the no-load speed. The higher the initial phase voltage applied to the field of the motor, the higher the break-away torque. Once the motor starts to rotate the phase voltage is modified by the regulating action of the speed responsive device.

As a rule, it is desirable that the speed of the motor varies gradually with the torque. Abrupt changes in speed would tend to jerk the load. The slope of the curves may be selected to suit the job; however, flat speed-torque curves, in which the speed is essentially constant over a wide range of torque may be undesirable because for such curves the current through the motor varies sharply and sever regulation problems may be encountered.

The Fig. 1 graph presents only one of many satisfactory characteristics. The purpose of this invention is to achieve this characteristic with minimum number of moving parts, low cost apparatus which shall not operate with excessive losses.

Since within the specific aspects of this invention a squirrel cage motor instead of a wound-rotor motor may be included, it is desirable to consider the speed-torque characteristics of a squirrel cage motor. Where the bars of the rotor have low resistance (low starting torque, low slip) and there is low resistance in the field circuit, the envelope for a squirrel cage motor resembles the natural characteristic shown in Fig. 1. This characteristic may be changed by employing higher slip designs. High torque, high slip design would result in an envelope approximating that shown in heavy broken lines in Fig. 1. In any case, speed control of the motor can be obtained by the methods described here.

Figure 2:
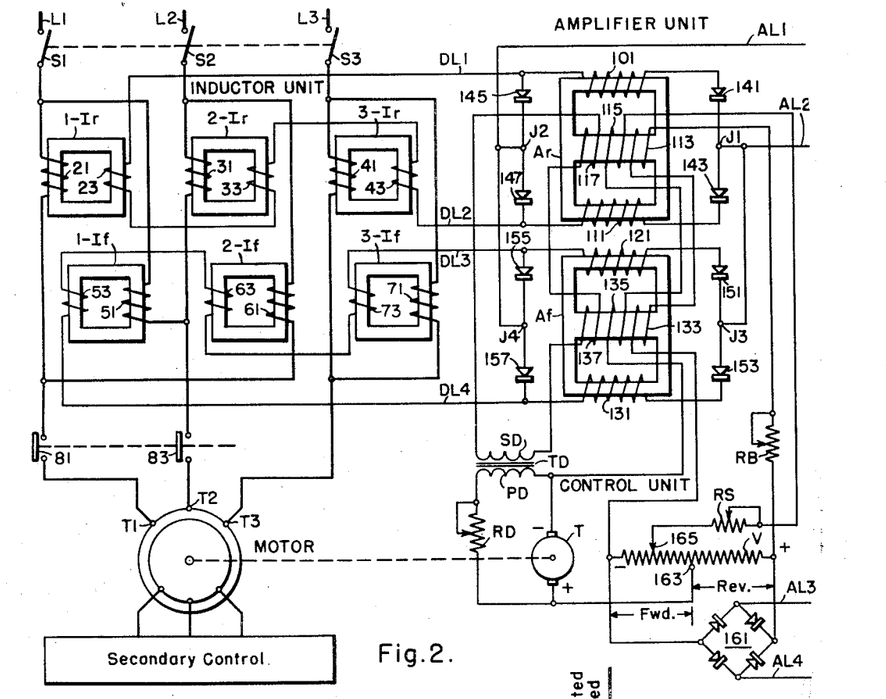
Fig. 2 is a circuit diagram of a preferred embodiment of this invention.

*Description.—Fig. 2*

The apparatus shown in Fig. 2 includes a motor, an inductor unit, an amplifier unit, and a control unit. This apparatus is supplied from the conductors or buses L1, L2, L3 of a commercial supply of the required voltage through disconnect switches S1, S2, S3.

The motor is of the three phase wound rotor type. This motor includes a stator or primary having terminals T1, T2 and T3 and a wound rotor. A network labelled secondary control is connected to the rotor. This network may be a resistance bank of the type disclosed in the Wickerham patent and labelled SRC.

The inductor unit includes two groups of inductors 1–If, 2–If, 3–If and 1–Ir, 2–Ir, 3–Ir. These inductors are of the saturable core type each having an alternating current output winding 21, 31, 41, 51, 61, 71 and a direct current input winding 23, 33, 43, 53, 63, 73. The magnitude of the direct current through each input winding determines the saturation of the inductor and thus the impedance in circuit with the output windings. The output winding 21 of inductor 1–Ir is connected between conductor L1 and terminal T1 through disconnect S1 and the contacts 81 of a line contactor similar to the contactor HC2 of Wickerham patent. If desired, a contactor analogous to contactor HC1 of the Wickerham patent may also be included but in this case the contactor should include contacts to bypass all three inductors 1–If through 3–If and 1–Ir through 3–Ir. In accordance with the Wickerham patent the motor is controlled from the secondary resistances SRC when the contactor HC1 is closed and this control is independent of the control through the inductors A1, A2, B1, B2 when the contactor HC2 is closed. It is within the scope of this invention to combine the control of secondary resistances (such as SRC) with the control of the inductors 1–If through 3–If and 1–Ir through 3–Ir. By varying the secondary resistances the envelope of the characteristics of the motor may be varied. The output winding 51 of inductor 1–If is connected between terminal T2 and conductor L1 through the same disconnect S1 and through contact 83 of the same contactor. The output winding 31 of inductor 2–Ir is connected between conductor L2 and terminal T2 through the disconnect S2 and contact 83 and the output winding 61 of inductor 2-If is connected between conductor L2 and terminal T1 through disconnect S2 and contact 81. The output winding 41 and 71 of inductors 3–Ir and 3–If are connected in parallel between conductor L3 and terminal T3 through disconnect S3. The input windings 23, 33, 43 are supplied from conductors DL1 and DL2 and the input windings 53, 63, 73 from the conductors DL3 and DL4 of the amplifier.

The amplifier unit includes a pair of magnetic amplifiers Ar and Af. Each magnetic amplifier has a pair of alternating current output windings 101 and 111 and 121 and 131 and a plurality of direct current input windings, a biasing winding 113 and 133, a speed control winding 115 and 135, and a damping winding 117 and 137. The input windings are supplied from the control unit. The output windings 101 and 111 of amplifier Ar are interconnected at their terminals through rectifiers 141 and 143 and 145 and 147 poled to conduct positive current from winding 101 to winding 111. By positive current the conduction of positive ions or holes as distinguished from electrons is meant. The rectifiers 141 and 143 have a junction J1 and the other rectifiers a junction J2. The output windings of amplifier Af are similarly interconnected through rectifiers 151, 153, 155, 157 having junctions J3 and J4. Each pair of junctions J1 and J2 and J3 and J4 are connected to a pair of supply conductors or buses AL1 and AL2 which may conveniently derive their power from a pair of the phase conductors L1, L2, L3. If necessary, a transformer (not shown) is interposed between the two phase conductors and the conductors AL1 and AL2.

The amplifiers Ar and Af are thus connected in bridge rectifier networks with rectifiers 141 through 147 and 151 through 157, respectively. The rectifier networks rectify the potential impressed by conductors AL1 and AL2. The conductors DL1 and DL2 and DL3 and DL4 are connected to the junctions of rectifier 145, 147, 155 and 157 and windings 101, 111, 121, 131, respectively, and derive direct current from the networks. The magnitude of this direct current depends on the impedances of the amplifiers Ar and Af.

The control unit includes a tachometer generator T driven either from the motor or from the load actuating apparatus such as the hoist drum and a supply of variable direct current potential which may conveniently be derived from a voltage divider V energized from conductors AL3 and AL4 through a rectifier 161. Conductors AL3 and AL4 may be energized from a pair of the conductors of the supply L1, L2, L3. The divider V has an intermediate tap 163 and an adjustable arm 165.

The divider V is connected in a series circuit extending from the adjustable arm 165 through a current limiting resistor RS, the speed control windings 115 and 135 of the amplifiers Ar and Af, the tachometer T to the center tap 163 of the divider. Essentially, resistor RS determines the slope of the speed-torque curves obtained. The greater its ohmic resistance magnitude, the greater the change in speed with change in torque. When the adjustable arm 165 is set to the left of the center tap 163 the divider supplies positive current from left to right in each of the speed regulating windings 115 and 135 of the magnetic amplifiers Ar and Af. The speed regulating winding 135 of amplifier Af is so wound relative to the output windings that above certain magnitudes of input current of this polarity an increase in this current reduces the impedance of the amplifier Af to a low magnitude permitting the current through the output windings 121 and 131 to increase to a high magnitude. With the adjustable arm 165 of the divider to the right of the center tap 163 the converse effect takes place. The current supplied by the divider flows from right to left through the speed regulating windings 115 and 135 and an increase in this current increases the output of the amplifier Ar to a high magnitude above certain magnitudes of the input current.

Figure 3:
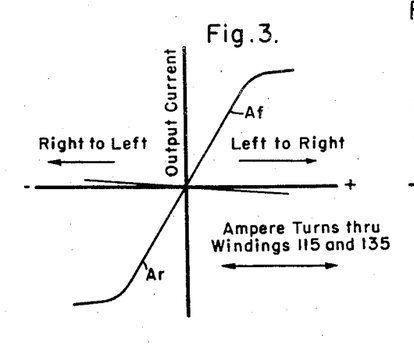
Fig. 3 is a graph showing the relationship between the excitation and the output of certain of the reactors of the apparatus shown in Fig. 2.

The biasing windings 113 and 133 are supplied in series from the rectifier 161 through a variable biasing resistor RB. The biasing current flowing through windings 113 and 133 is of such polarity and of such magnitude as to relate properly to the changes in output current of the amplifier Ar and Af for changes in the current flowing through the speed control windings 115 and 135. The desired relationship is shown in Fig. 3 in which the output current of each amplifier is plotted vertically and the input in ampere turns horizontally. As can be seen, an increase in the current flowing from right to left increases the output of amplifier Ar while the output of amplifier Af remains at a low magnitude and an increase in the current flowing from left to right increases the output of amplifier Af while the output of amplifier Ar remains low. The damping windings 117 and 137 are supplied in series from the secondary SD of a damping transformer TD. The primary PD of this transformer is supplied through a variable damping resistor RD from the tachometer T. The damping windings 117 and 137 reduce the effect of sudden changes in the tachometer output produced by sudden changes in the motor speed. The effect of the damping windings is thus to suppress oscillations of the system which may occur by reason of the inductive lag of the indicators and magnetic amplifiers.

*Standby.—Fig. 2*

In the standby condition of the apparatus shown in Fig. 2, the disconnects S1, S2 and S3 are closed and power is available to energize the motor, the amplifier unit and the control unit. But the motor supply is open at contacts 81 and 83 and the conductors AL1 and AL2 and AL3 and AL4 may be maintained deenergized by control mechanisms analogous to those disclosed in the Wickerham patent as controlled from master switch MC.

*Operation.—Fig. 2*

In considering the operation of the apparatus it may be assumed first that a load is to be lifted. Under such circumstances the apparatus is set to deliver a torque of the proper magnitude and polarity and this is accomplished by setting the inductors to the proper impedances.

The instantaneous potential of each terminal T1, T2, T3 of the motor is determined by the impedances of the inductors, 1–Ir through 3–Ir and 1–If through 3–If, through which the terminals are respectively connected to the conductors L1, L2 and L3. The impedance of the inductors is determined by the output of the amplifiers Ar and Af and this is determined by the control unit. As can be seen from Fig. 3 with current flowing from left to right through the windings 115 and 135, an increase in the input current results in an increase in the output of amplifier Af; that is of the current flowing from the conductors DL3 and DL4, and an increase in the current flowing from right to left results in an increase in the output current of amplifier Ar; that is, an increase in the current flowing through the conductors DL1 and DL2. Under the former circumstances the saturation of inductors 1–If, 2–If and 3–If is increased and in the latter case the saturation of the inductors 1–Ir, 2–Ir and 3–Ir is increased. The polarity of the current initially flowing through the windings 115 and 135 is determined by the setting of the divider V and for any setting of the control unit on either side of the center tap 163, there are in series with each pair of the conductors L1, L2, L3 and each pair of terminals T1, T2, T3 a pair of low impedances and a pair of high impedances. The magnitude and phase rotation of the potential impressed on the motor is determined essentially by the inductances having the lower impedances but whatever the magnitude the potential supplied to the motor is balanced. Thus, if high current flows through conductors DL3 and DL4, the impedances 1–If, 2–If and 3–If are low and the potentials at terminals T1, T2, T3 respectively, are the potentials at L2, L1, L3 respectively, less the drop across 1–If, 2–If, 3–If respectively; if the current through conductors DL1 and DL2 is high the potentials at terminals T1, T2, T3 are the potentials at L1, L2, L3, respectively less the drop across 1–Ir, 2–Ir, 3–Ir.

Figure 4:
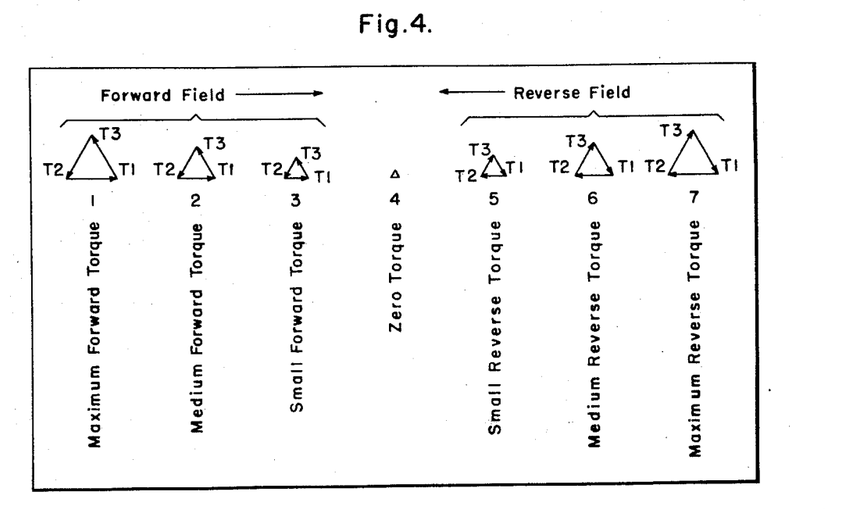
Fig. 4 is a table showing the relationship of the phase potentials impressed on the motor for various settings of the apparatus shown in Fig. 2.

The relationship between the potentials at the terminals T1, T2, T3 for various settings of the divider V is shown in Fig. 4. This figure is a table showing the relationship of vectors representing the potentials impressed on the motor. The three columns on the left present the condition which arises when the inductors 1–If, 2–If and 3–If have low impedances progressively increasing from left to right and the three columns on the right represent the conditions which arise when the inductor 1–Ir, 2–Ir and 3–Ir have low impedances progressively decreasing from left to right. It is seen that in the latter case the phase rotation is T1, T2, T3 and in the former case the phase rotation is T1, T3, T2. In the former case the motor is energized to exert a torque such as to raise the load and in the latter case a torque such as to lower or drop the load. The central column represents the condition when the impedance of all inductors is high. Under such circumstances the field impressed on the motor is very low and the motor has zero torque. It is seen that for each setting of the inductor unit the potential applied to the motor from the three phases L1, L2 and L3 are balanced. The motor field is thus circular and losses by reason of counter currents are avoided.

Figure 5:
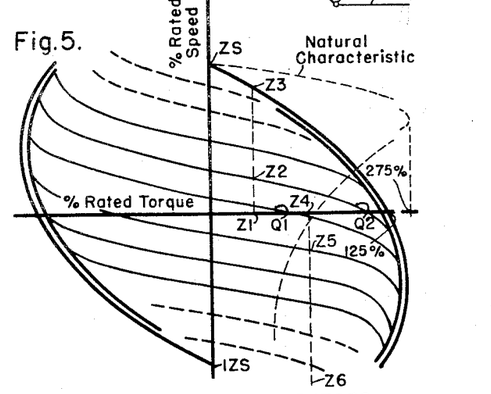
Fig. 5 shows typical speed-torque curves for the apparatus shown in Fig. 2.

A typical speed-torque graph for the apparatus shown in Fig. 2 is shown in Fig. 5. In this view speed is plotted vertically in percent of no-load rotor-shorted speed and torque horizontally in percent of rated torque. The broken line curve is the natural characteristic of the motor and it is seen as having a peak at about 275 percent of rated torque. In this case the envelopes of the graph which depend on the secondary resistance of the motor pass through the torque axis at about 125 percent of the rated torque of either polarity. The various curves correspond to different settings of the voltage divider. In the situation under consideration the divider V is set with the arm 165 to the left of the tap 163 at a point such that the break-away torque is adequate to raise the load. The Fig. 5 curves correspond to a situation in which the load is applied approximately the same regardless of the direction of rotation of the motor, as for example in a counterweighted elevator or hoist or travel drives of cranes. Another typical graph to which the apparatus shown in Fig. 2 would be set under different conditions is shown in Fig. 1.

To raise or otherwise move the load, a master switch similar to Wickerham's MC is moved to the first point. This results in the closing of contacts 81 and 83 and in the energizing of conductors AL1 and AL2 and AL3 and AL4.

The motor is initially a rest and the initial torque corresponds to the break-away torque determined by the setting of the divider V. (This is analogous to the settings of resistor R4 by Wickerham's master switch MC.) If divider V is at the lowest current setting for the required direction of rotation, the break-away torque corresponds to the magnitude at point Q1 of Fig. 5. If this is inadequate the divider V may be moved to the next setting in which case the break-away torque is at Q2. If this is adequate, the motor starts to rotate and raise or otherwise move the load. The torque and therefore, current drawn by the motor cannot be any higher than that corresponding to Q2 so long as the inductor unit is in the motor current. As the motor rotates, the tachometer potential is built up and is impressed in series with the output of the divider V. In addition, damping potential may be impressed through the secondary SD. The tachometer potential is of such polarity as to oppose the divider; in the situation illustrated in the drawing, the lower terminal of the tachometer would be positive and the upper terminal negative. Since initially the speed and the rate of change of speed are relatively low (see Fig. 5) the load is initially gradually raised and not jerked. As the apparatus continues to operate, the motor accelerates to an extent dependent on the field applied to it and this in turn depends on the setting of the divider V as modified by the tachometer T. The motor eventually reaches a speed at which it balances the torque requirement; if the curve Q2 were selected for the required torque Z1, this would be Z2. To cause the motor speed to approach synchronous speed the divider V may be reset so that the ultimate point of operation is Z3 which is nearly ZS the synchronous point. It is seen that the high speed of the motor is achieved with a starting torque at Q2 which is less than 125% rated torque which is well within the motor and attendant control components.

It is desirable that the acceleration be smooth and not abrupt and that the speed-torque characteristic should be sloping and this object is accomplished by properly setting the divider, the tachometer output and the speed regulating resistor RS. Where a flat speed-torque characteristic within a reasonable torque range is desired, it can of course be obtained in the practice of this invention. As the operation proceeds the master switch (MC) may be moved to adaptation of hoist positions 3, 4, 5, 6 (see Fig. 8 Wickerham patent) and the motor continues to rotate at the new settings until the load is raised to the position desired.

Now consider the situation in which a load is lowered. Under such circumstances, the voltage divided V is set for reverse operation of the motor, that is, with arm 165 to the right of tap 163 so that the impedances of 1–Ir, 2–Ir and 3–Ir are low. Since the load is initially requiring positive torque on the motor in the reverse direction, this setting should provide for an initial torque of moderate magnitude. The lowering operation may be started by setting the master switch MC to position 1 lower. The motor then starts to rotate and as it rotates a potential appears across the tachometer T. This potential is of opposite polarity to the potential which appears when the motor is rotating in the raise or forward direction and opposes the potential of the voltage divider V. The load may overhaul the motor and cause it to reach or exceed the speed for zero torque corresponding to the selected characteristic. Any tendency of the motor to be overhauled at a higher speed than the speed at zero torque is counteracted at this point by a counter-torque plugging (Quadrant IV, Fig. 5), the effect of which is added to the effect of tachometer T. At a point Z5 where the motor torque counterbalances the overhauling torque Z4, the motor stabilizes. Increase to near synchronous speed Z6 may be obtained by setting the divider V further to the right. In lowering the load the motor should operate smoothly and should not have a sloping speed-torque characteristic as previously described. As the operation continues, the master switch MC is moved to adapting positions 2, 3, 4 and 5 as disclosed in the Wickerham patent until the load reaches the position desired.

Squirrel cage motor.—Fig. 2

In accordance with the specific aspects of this invention the motor may be of the squirrel cage rather than the wound rotor type. In operating with such a motor, the divider V may be set to provide an envelope within the natural characteristic. The rotor of the motor may also have high resistance bars.

Figure 6:
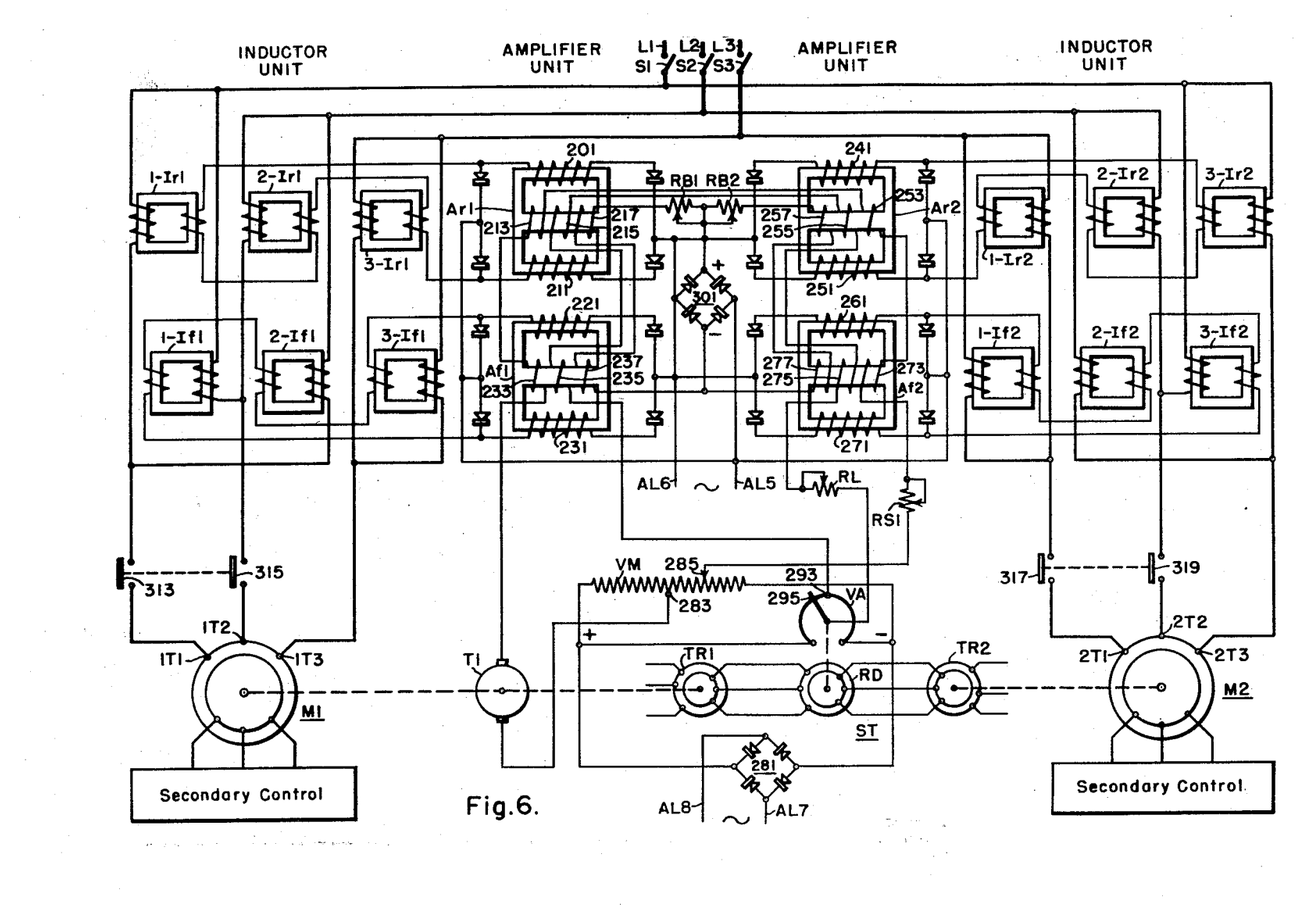
Fig. 6 is a circuit diagram of an adaptation of the embodiment of Fig. 2 to the control of a tower drive type of vertical lift bridge driven by a pair of motors, one in each tower.

Fig. 6

In Fig. 6 the invention shown in Fig. 2 is applied to the actuation of a vertical lift bridge. In this case the lift bridge is raised and lowered by two motors M1 and M2 each of which is supplied from conductors L1, L2, L3 through two groups of inductors 1–Ir1, 2–Ir1, 3–Ir1, 1–If1, 2–If1, 3–If1, 1–Ir2, 2–Ir2, 3–Ir2, 1–If2, 2–If2, 3–If2. The inductors are controlled from amplifiers Ar1, Af1, Ar2, and Af2, respectively, in the same manner as in the Fig. 2 embodiment. The output windings 201, 211, 221, 231 and 241, 251, 261, 271 of the amplifiers Ar1, Ar2, Af1 and Af2 are supplied with the alternating potential from a pair of conductors AL5 and AL6 which may derive their power from one of the phases of the supply through a suitable transformer (not shown). The usual contacts (not shown) for starting may be interposed in series with the supply conductors AL5 and AL6.

While for the purpose of avoiding undue complexity no provisions for stabilizing the regulating system are shown in Fig. 6, such provisions are in practice included. In a typical system additional windings are provided on the magnetic amplifiers to accommodate signals from damping transformers or other stabilizing means.

A single control unit is provided for both motor control systems. This unit includes a tachometer T1 driven from motor M1 directly or through the load handling equipment (hoist drum) and a synchronous differential system ST including a synchro-tie transmitter TR1 similarly driven from motor M1, a synchro-tie transmitter TR2 similarly driven from motor M2 and a single differential synchro-tie receiver RD which is differentially energized from the transmitters TR1 and TR2.

The control unit also includes a main voltage divider VM similar to V of the Fig. 2 embodiment. This divider VM is energized from conductors AL7 and AL8 through a rectifier 281. The conductors AL7 and AL8 may derive their power from one of the phases of the supply L1, L2, L3 through the usual transformers and contacts (not shown).

The divider VM supplies potential to the speed control windings 213, 233, 253, 273, of the amplifiers Ar1, Ar2, Af1 and Af2 in a circuit extending from the center tap 283 of the divider through the tachometer T1, the speed control windings 233, 213, 253, 273 of the amplifiers Af1, Ar1, Ar2, Af2, a current limiting resistor RS1 to the adjustable arm 285 of the divider.

The control unit also includes an auxiliary divider VA having an adjustable arm 295 and an intermediate tap 293. The adjustable arm is connected to the differential synchro-tie receiver RD so that it assumes the position of this receiver. This divider is also supplied from the rectifier 281 which supplies the main divider VM and is connected in a circuit extending from the intermediate tap 293 through windings 235, 215, 255, 275 of the amplifiers Af1, Ar1, Ar2 and Af2, a resistor RL to the adjustable arm 295. The resistor RL may be variable but is usually of the type that is set when the apparatus is initially installed and remains so set. The windings 235, 215, 255, 275 are called the level windings because they carry the current which controls the leveling of the movable span of the bridge. Bias is supplied to the amplifiers Ar1, Ar2, Af1 and Af2 from conductors AL5 and AL6 through a rectifier 301. The rectifier 301 is connected in series with the biasing windings 217 and 237 of the amplifiers Ar1 and Af1 through a resistor RB1 and with the bias windings 257 and 277 of the amplifiers Ar2 and Af2 through another resistor RB2.

In the stand-by condition the adjustable arm 295 of the auxiliary voltage divider VA is in contact with the intermediate tap 293. To operate the motors M1 and M2 to lift the span the main divider VM is set for a substantial forward break-away torque. In this setting, the divider when energized supplies current through the speed control windings 213, 233, 253, 273 of the amplifiers Ar1, Ar2, Af1 and Af2 of such polarity that the amplifiers Af1 and Af2 have a low impedance and the impedance of the other amplifiers Ar1, and Ar2 and of the associated inductors is correspondingly high.

Once the divider is set, a master switch similar to Wickerham's MC is moved to hoist position 1 and the contacts 313, 315, 317, 319, in series with terminals 1T1 and 1T2 and 2T1 and 2T2 of the motors and the other contacts (not shown) for the control unit are closed. With these contacts closed, balanced power is supplied to the motors M1 and M2 in such a direction as to lift the span. The tachometer T1 introduces counter potential in the circuit of the speed control windings 213, 233, 253, 273 such that the speed of operation of the motor M1 is of the desired magnitude.

The speed of operation of the motor M2 is maintained the same as the speed of operation of the motor M1 so that the bridge remains level by the operation of the synchro-tie system ST. If motor M1 operates at a higher speed than motor M2, the differential receiver RD actuates the adjustable arm 295 of the divider VA so as to introduce a compensating potential in the level windings 215, 235, 255, 275 which reduces the speed of motor M1 and increases the speed of motor M2. If motor M2 tends to operate at a higher speed than motor M1 the receiver RD causes the adjustable arm 295 of the divider VA to move to the opposite side of the tap 293 and correspondingly to reduce the speed of motor M2 and increase the speed of motor M1. The response of the synchro-tie system and its effect on the inductor unit is such as to maintain the span entirely level within the predetermined operating performance characteristics of the motors M1 and M2 and the inductor units.

In practice the motors M1 and M2 in combination with the inductor units can cover the whole range of operation required by the span and reach approximate synchronous speed only if their secondary resistances are set for a high break-away torque of the order of 250% of rated torque (curve K Fig. 1). But for such a setting the motors and attendant control would be highly loaded so that as a rule, to avoid such loading, provisions are made which are analogous to Wickerman's in the higher settings of his switch MC. The motors with the adapted switch moved to its higher settings, would be operated directly from the supply and not through the inductor units and would be controlled by controlling their secondary resistances. The leveling would then be effected by the control by receiver RD, or an analogous one, of contacts in the motor secondaries.

Once this pan is in its uppermost position it may be lowered by a reverse operation. In this case, the main divider VM is set so that the impedance of the inductors 1–Ir1, 2–Ir1, 3–Ir1 are reduced and the motors rotate in the opposite direction. In this case, the tendency of the span to overhaul is counteracted by the counter-torque braking of the motors.

Figures 7, 8:
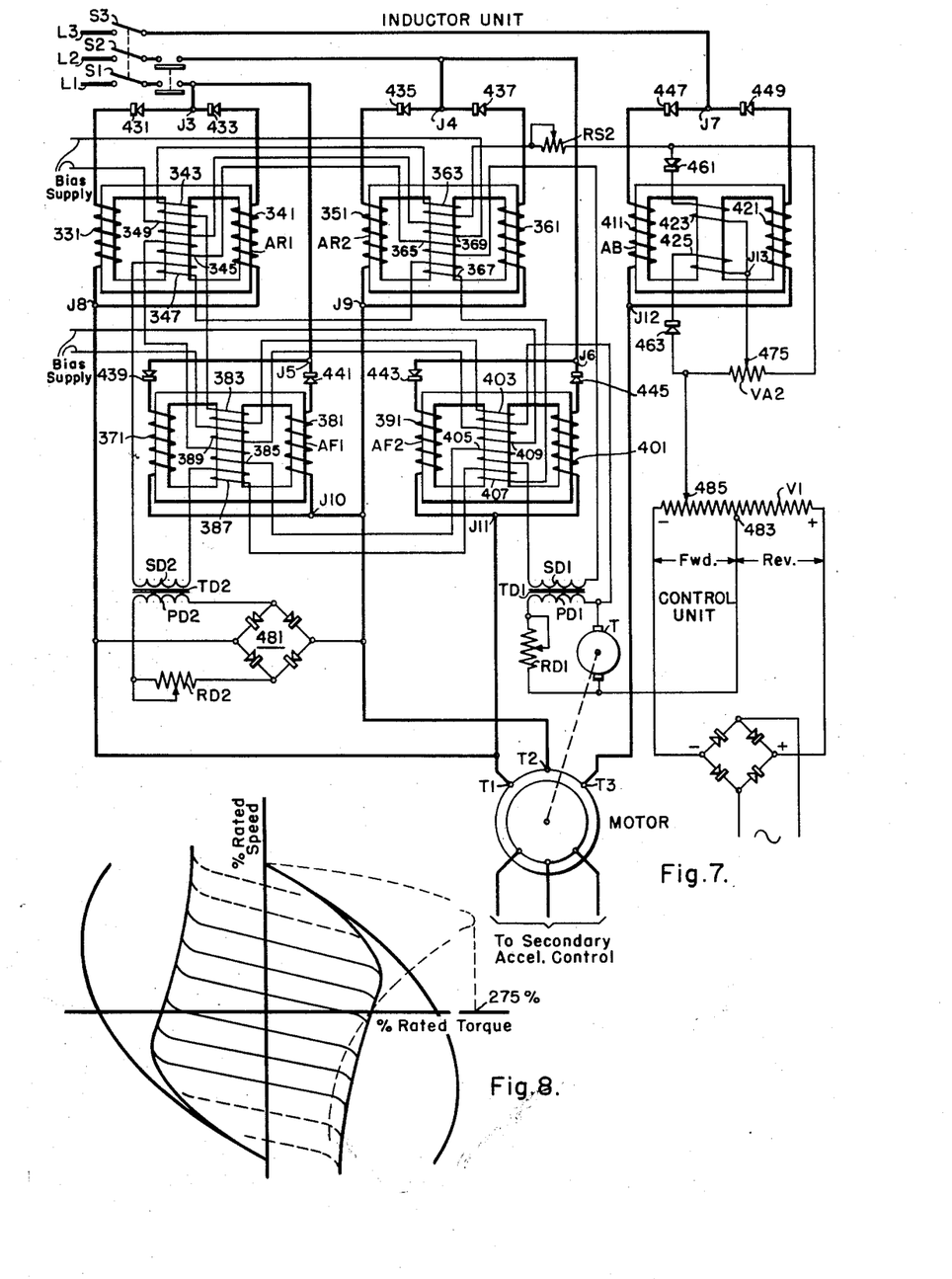
Fig. 7 is a circuit diagram of a modification of this invention.
Fig. 8 is a speed-torque curve for the modification shown in Fig. 7.

Fig. 7

In the apparatus shown in Fig. 7, the motor is supplied directly from magnetic amplifiers. In addition, instead of including two groups each having two magnetic amplifiers for reversing and one for balancing, the Fig. 7 modification includes only one balancing amplifier common to the two groups.

Accordingly, the apparatus shown in Fig. 7 includes magnetic amplifiers AR1 and AR2 and AF1 and AF2, and a balancing magnetic amplifier AB. Each of the amplifiers AR1, AR2, AF1 and AF2 has a pair of output windings 331, 341, 351, 361, 371, 381, 391, 401 and four input windings, including one speed control winding 343, 363, 383, 403, two damping windings 345 and 347, 365 and 367, 385 and 387, 405 and 407 and one biasing winding 349, 369, 389, 409.

The balancing amplifier AB has a pair of output windings 411 and 421 and a pair of input windings 423 and 425. The input windings are so wound that current flow through each reduces the impedance of the balancing amplifier AB. In practice the amplifier AB will include additional windings for bias and damping signals.

The output windings 331 and 341, 351 and 361, 371 and 381, 391 and 401, 411 and 421 of each amplifier AR1, AR2, AF1, AF2 are interconnected at one terminal through a pair of rectifiers 431, 433, 435, 437, 439, 441, 443, 445, 447, 449 poled to conduct positive current from one of the windings to the other (341 to 331, 361 to 351, 381 to 371, 401 to 391). Each pair of rectifiers has a junction J3, J4, J5, J6 and J7. The junctions J3 and J5 are adapted to be connected to conductor L1 through disconnect S1. The junctions J4 and J6 are adapted to be connected to conductor L2 through disconnect S2 and junction J7 is adapted to be connected to conductor L3 through disconnect S3. The remaining terminals of the output windings of the amplifiers AR1, AR2, AF1, AF2 and AB are connected together at junctions J8, J9, J10, J11, J12. Junctions J8 and J11 are connected to terminal T1, J9 and J10 to T2, J12 to T3.

The input windings 343, 345, 347, 349, 363, 365, 367, 369, 383, 385, 387, 389, 403, 405, 407, 409 of amplifiers AR1, AR2, AF1 and AF2 are connected to the control unit. The input windings 423 and 425 of the balancing amplifier AB are interconnected through a pair of rectifiers 461 and 463 and a voltage divider VA2. The adjustable arm 475 of the divider is connected to a common terminal J13 of each of the input windings. The other terminal of one of the windings 423 is connected to one terminal of the divider VA2 through a rectifier 461 poled to conduct positive current from the divider to this input winding and the corresponding terminal of the other input winding 425 is similarly connected through a rectifier 463 to the other terminal of the divider. It is seen that one winding or the other can conduct depending on the polarity of the potential impressed on the divider VA2.

The control unit is similar to the control unit of the Fig. 2 modification except that the control unit of the Fig. 7 modification includes facilities for supplying both sets of damping windings to suppress oscillations of the system. One set 405, 385, 345, 365 is supplied from the secondary SD1 of a damping transformer TD1, the primary PD1 is connected across tachometer T through a variable resistor RD1; and the other set 347, 367, 407 and 387 is supplied from the secondary SD2 of a transformer TD2, the primary PD2 of which is connected across terminals T1 and T2 through a rectifier 481 and a variable resistor RD2. In practice, the control unit will also include facilities for supplying damping signals to amplifier AB.

The main divider V1 of the control unit is connected in series with the speed control windings of the amplifiers AR1, AR2, AF1, AF2 and AB but the connection depends on the setting of the adjustable arm of the divider. When the adjustable arm 485 of the divider is set as shown in Fig. 7, to the left of the intermediate tap 483, the tap is positive relative to the adjustable arm and the divider is connected in a circuit extending from the tap 483 through the tachometer T through the speed control windings 403, 383, 343, 363 of the amplifier AF2, AF1, AR1, AR2, a resistor RS2, usually varied only during initial installation, the rectifier 461, one of the speed control windings 423 of the amplifier AB, to the center tap 475 of the voltage divider VA2 through the left hand portion of the divider VA2 to the adjustable arm 485 of the main divider V1. When the adjustable arm 485 of the main divider V1 is set to the right of the tap 483 this arm is positive relative to the tap and the main divider is connected in a circuit extending from the arm 485 through the rectifier 463, with the other speed control winding 425 of the amplifier AB to the center tap 475 of the divider VA2, the right hand portion of this divider, the resistor RS2, the speed control windings 363, 343, 383, 403, of the amplifiers AR2, AR1, AF1, AF2, tachometer T to the center tap of the main divider.

The speed control windings of the amplifier AR1, AR2, AF1 and AF2 are so wound that with the adjustable arm of the main divider to the left of the center tap and the tachometer T at rest, the current through the input windings 383 and 403 of the amplifier AF1 and AF2 is in such a direction as to reduce the impedance of these amplifiers and the current through the windings 343 and 363 of the others AR1 and AR2 is in such a direction as to maintain the impedance of these amplifiers at a high magnitude. The current flow through the selected one 423 of the windings of the amplifier AB is in such a direction as to reduce the impedance of this amplifier. Thus, balanced potential of a magnitude determined by the impedances of the amplifier AF1, AF2 and AB is supplied to the motor. Correspondingly with the adjustable arm 485 of the main divider to the right of the tap 483, the impedance of the amplifiers AR1, AR2 and AB are reduced while the impedances of the amplifier AF1 and AF2 remain at a high magnitude and again the potential impressed on the motor is balanced and is determined by the setting of the amplifiers AR1, AR2 and AB.

The system shown in Fig. 7 has a speed torque characteristic shown in Fig. 8. The family of curves in Fig. 8 covers a smaller range than the corresponding family of curves of Fig. 5 because the voltage absorbed by the magnetic amplifiers AR1, AR2, AF1, AF2 and AB is substantially greater than the voltage absorbed by the inductors 1–Ir, 2–Ir, 3–Ir, 1–If, 2–If, 3–If. Thus, the inductors 1–Ir through 3–If when fully saturated absorbs only about 5% of the line voltage while power magnetic amplifiers AR1 through AB absorb about 20% of the line voltage.

Figure 9:
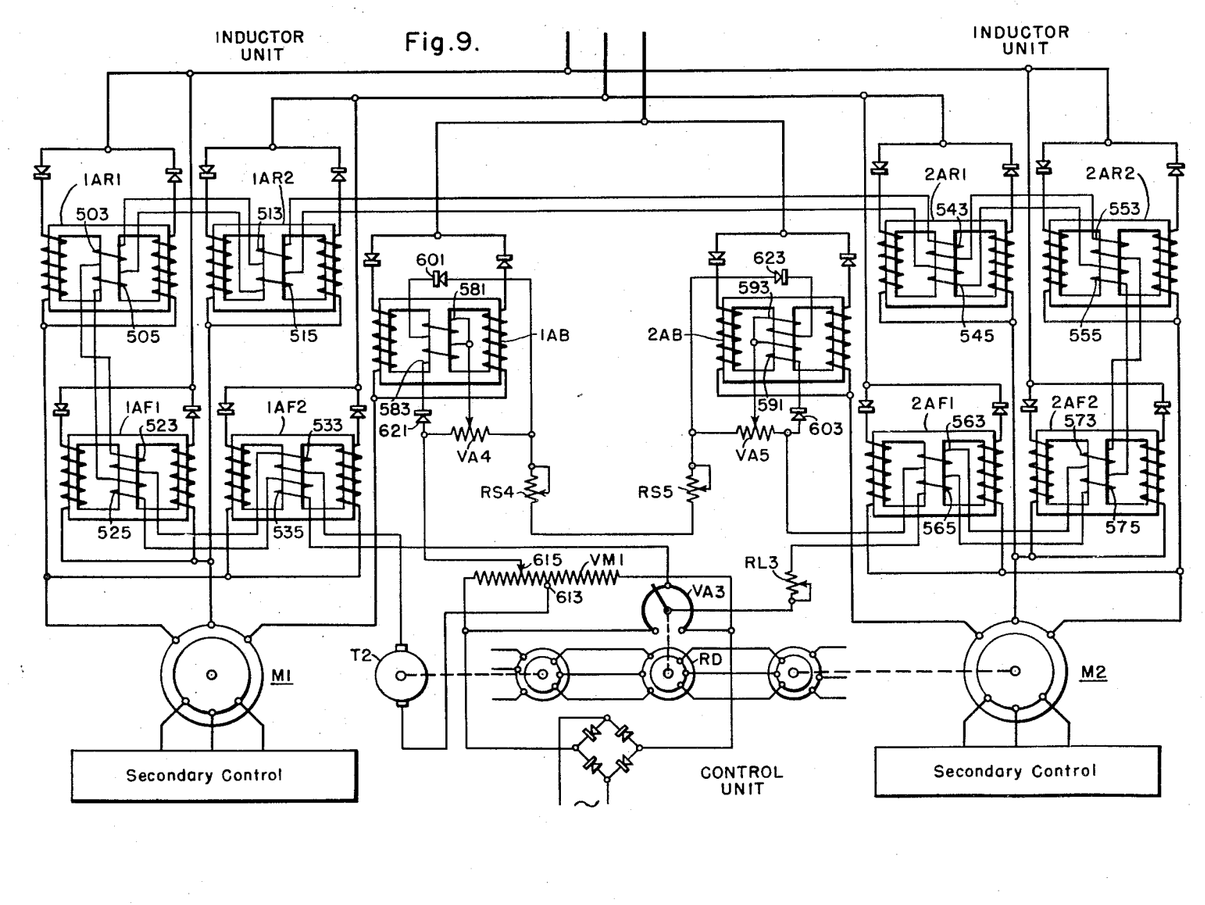
Fig. 9 is a circuit diagram of an adaptation of the modification shown in Fig. 6 to the control of a tower drive type of vertical lift bridge driven by a pair of motors, one in each tower.

Fig. 9

In Fig. 9 the modification shown in Fig. 7 is shown applied to a vertical lift bridge analogously to the application of the embodiment shown in Fig. 2 to the lift bridge system shown in Fig. 6. In this case the damping windings are omitted on the amplifiers 1AR1, 1AR2, 2AR1, 2AR2, 1AF1, 1AF2, 2AF1, 2AF2, each having only two input windings, one, 503, 513, 523, 533, 543, 553, 563, 573, supplied from the main divider VM1 and the other, 505, 515, 525, 535, 545, 555, 565, 575, supplied from the auxiliary divider VA3 which responds to the differential receiver RD and the usual biasing windings. The former input windings 503, etc. are connected in series with the main divider VM1, tachometer T2, resistors RS4 and RS5, input windings 581 and 591 of amplifiers 1AB and 2AB, rectifiers 601, 603 and the left hand and right hand portions of dividers VA4 and VA5. The windings 505, 515, 525, 535, 545, 555, 565, 575 are connected in series with divider VA3 and resistor RL3 and serve for leveling the span.

Figure 10:
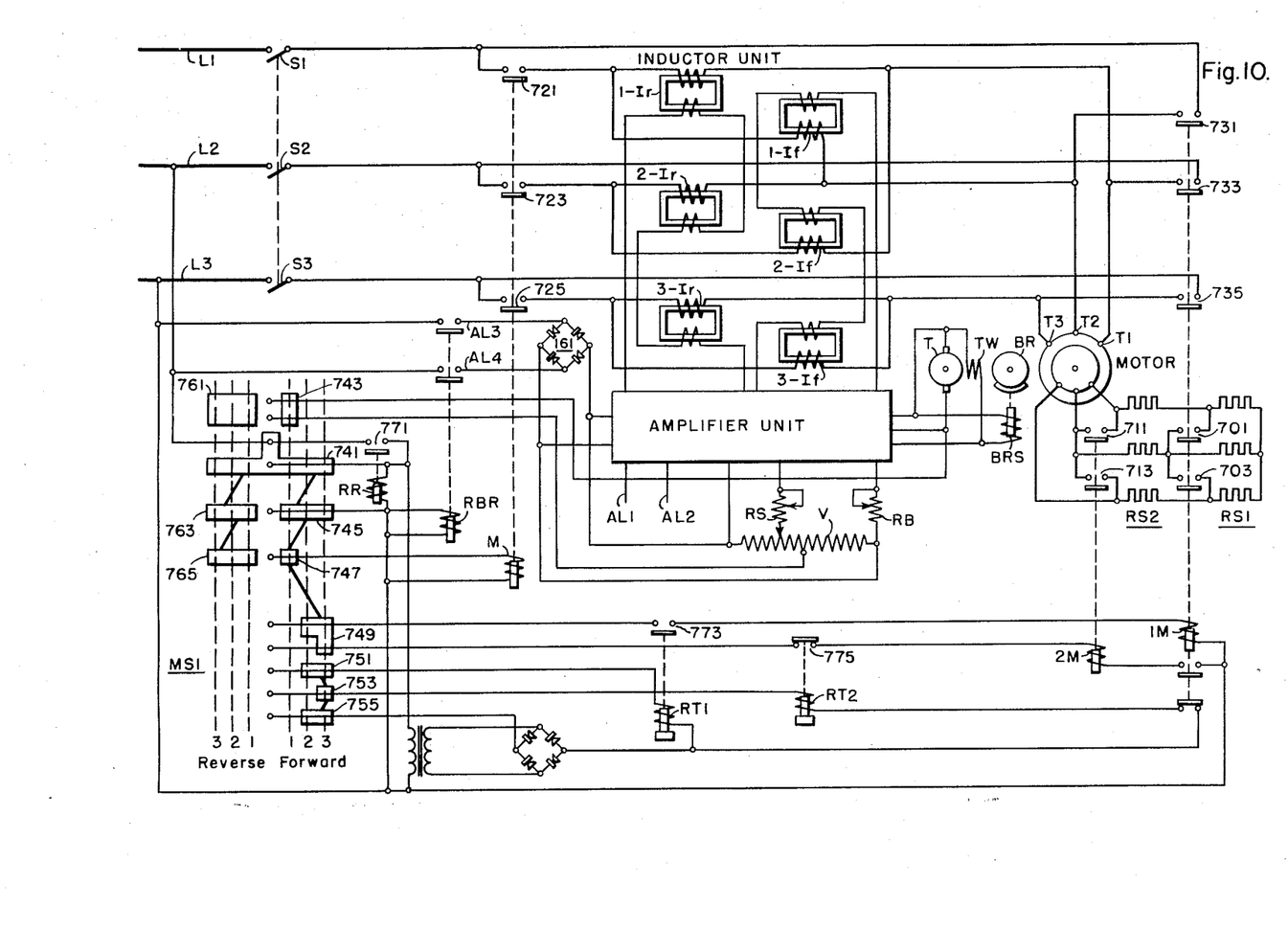
Fig. 10 is a diagrammatic view showing a complete control system including the inductor unit shown in Fig. 2.

Fig. 10.—Description

Fig. 10 shows a complete control system including the inductor unit shown in Fig. 2. In actual practice, this system will include other components in addition to those shown. Thus, an overload device will be included; this device will operate to cause relay RR to drop out not only for undervoltage but also for excessive overload conditions. In this case the motor is shown with its brake BR and the tachometer T with its shunt field winding TW. A solenoid BRS is provided for actuating the brake and this solenoid is energized through the rectifier 161 (Fig. 2) analogously to the solenoid (33 of Fig. 8) of the Wickerham patent when the relay RBR in the control unit is actuated. The field TW is also supplied from the conductors AL3 and AL4 through the rectifier 161 (Fig. 2), the supply being controlled from relay RF in the control unit.

Banks of resistors RS1 and RS2 are connected to the rotor of the motor. One bank, RS1, may be shunted out by the contacts 701 and 703 of contactor 1M and the other by the contacts 711 and 713 of the contactor 2M.

The supply of power from the conductors L1, L2, L3 to the inductor unit is controlled from the contactor M in the control unit. This contactor has three contacts 721, 723, 725, one each interposed between the conductors L1, L2, L3 and the associated inductors 1–Ir and 1–If, 2–Ir and 2–If, 3–Ir and 3–If. The inductor unit may be entirely shunted out by the contacts 731, 733, 735 of the contactor 1M.

The control unit includes the master switch MS1. The master switch MS1 has a reset contact 741 and contacts 743, 745, 747, 749, 751, 753 and 755 which are engaged in the three forward positions and contacts 761, 763, 765, and 767 which are engaged together with reset contact 741 in the Reverse positions. Contact 741 controls reset relay RR which is maintained closed through its contact 771. When this relay drops out for an undervoltage (or an overload condition) the switch MS1 must be reset at its 0 position to reset the apparatus for operation. Contacts 743 and 761 maintain the circuit through the divider V closed in forward position 1 and the reverse position. Contacts 745 and 763 actuate the relay RBR in all forward and reverse positions of the switch. Contacts 747 and 765 actuate contactor M in forward position 1 and the reverse positions. Contacts 751 and 755 actuate time relay RT1 in forward positions 2 and 3. Contact 749 actuates contactor 1M through contact 773 of relay RT1 in forward positions 2 and 3, and through contact 775 of relay RT2 closes an energizing circuit for contactor 2M in forward position 3.

Relay RT2 is a slow drop-out relay which is actuated through contact 753 in forward position 3. This relay prevents actuation of contactor 2M immediately following actuation of contactor 1M if the switch MS1 is moved to forward position 3 without being held in forward position 2.

Fig. 10.—Operation

After the disconnects S1, S2, S3 are closed the operation may be started by moving the switch MS1 to forward position 1 or reverse position 1. In either position the motor is energized and produces torque. Initially the divider is set so that the potential supplied is low. The potential may be increased by setting the divider V to higher potential in the forward or reverse direction.

When it is desired to further increase the speed of the motor in the forward direction; the switch MS1 is moved to forward positions 2 and 3 in succession. In forward position 2 contactor 1M is actuated to connect the motor directly to the conductors L1, L2, L3 and to shunt out resistance bank RS1. In forward position 3 bank RS2 is shunted out.

When the motor is in reverse it is controlled from the divider V.

Conclusion

The invention disclosed herein has the following advantageous features not available in prior art apparatus.

(1) Terminal voltages of the motor are balanced for all torques.

(2) The heating of the motor, the inductor units and the related control components is at a minimum and the dimensions and capacity of these units may be at a minimum.

(3) In the case of Figs. 2 and 5, the motor phase currents are substantially equal to the supply line currents.

(4) If the system application demands smaller reverse than forward torques, one set of inductors, for example 1–Ir, 2–Ir, 3–Ir (or the analogous amplifier or the input amplifier Ar) may be smaller and less costly than the other.

(5) Since the system is balanced it is feasible to set the apparatus for higher torques by means of the inductor units; thus the number of accelerating contactors may be minimized.

(6) The system permits ready mathematical analysis by analogue computers for example.

While preferred embodiments of this invention have been shown and described, many modifications thereof are feasible. In addition where necessary additional features may be included in the apparatus thus in Figs. 2, 6 and 7, there may be contacts in all lines leading to the motor terminals T1, T2, T3 rather than only two (81 and 83; 313 and 315;). The invention, then, is not to be restricted except insofar as is necessary in the spirit of the prior art.

We claim as our invention:

1. In combination, a single magnetic amplifier unit having a single core, a first control winding and a second control winding on said core, current supply means which may be set to supply current of either polarity, first asymmetrically conductive connections capable of passing current of only one polarity connecting said supply means and said first winding, second asymmetrically conductive connections capable of conducting current of the opposite polarity connecting said supply means and said second winding and output winding means on said core.

2. Apparatus for controlling a first three-phase motor and a second three-phase motor from a three-phase supply, each of said motors having low resistance rotor circuits, comprising in combination, first inductor means connected in phase balanced relationship between said supply and said first motor, second inductor means connected in phase balanced relationship between said supply and said second motor, said first and second inductor means having control winding means, a differential mechanism responsive to the difference in speeds of said motors, and means responsive to said mechanism for supplying current to said control winding means in accordance with the difference in speed of said motors.

3. Apparatus for controlling a polyphase motor having first, second and third terminals, from first, second and third supply conductors of a polyphase source comprising in combination a first inductor, a second inductor, a third inductor, a fourth inductor, each of said inductors having output winding means and control winding means, means connecting in series said first conductor, said output winding means of said first inductor and said first terminal, means connecting in series said first conductor, said output winding means of said second inductor and said second terminal, means connecting in series said second conductor, said output winding means of said third inductor and said second terminal, means connecting in series said second conductor, said output winding means of said fourth inductor and said first terminal, control means for said control winding means connected to said control winding means and operative to vary the impedances of the first and third inductors in opposite sense to said second and fourth inductors, and means connecting said third conductor to said third terminal, the said apparatus being characterized by means connecting said third conductor to said third terminal which includes a single inductor having output winding means, first control winding means and second control winding means, said output winding means being connected between the third conductor and the third terminal, said first control winding means being connected to the control means so as to cause the impedance of said single inductor to vary with the impedance of the first and third inductors, and said second control winding means being connected to said control means so as to cause said impedance of said single inductor to vary with the impedance of the second and fourth inductors.

4. Apparatus for controlling the supply of power from a three phase source having first, second and third phase conductors to a first three phase motor and a second three phase motor, each of said motors having first, second and third phase terminals, comprising in combination first inductor means, means connecting said first inductor means in balanced relationship between said first, second and third conductors and said first, second and third phase terminals of said first motor, second inductor means, means connecting said second inductor means in balanced relationship between said first, second and third conductors and said first, second and third terminals of said second motor, means connected to said first inductor means and to said second inductor means for varying said inductor means in balanced relationship to set the speed of said motors at a predetermined magnitude, and means responsive to the difference between the speed of said first motor and the speed of said second motor and connected to said first, and second inductor means for unbalancing said inductor means to compensate for said difference in speed.

5. Apparatus for controlling the supply of power from a three phase source having first, second and third phase conductors to a first three phase motor and a second three phase motor, each of said motors having first, second and third phase terminals, comprising in combination first, second, third fourth and fifth inductors, each of said inductors having output winding means, first input winding means, and second input winding means, means connecting the output winding means of the first inductor between said first conductor and the first phase terminal of said first motor, means connecting said output winding means of said second inductor between said second conductor and said second phase terminal of said first motor, means connecting said output winding means of said third inductor between said first conductor and said second phase terminal of said first motor, means connecting said output winding means of said fourth inductor between said second conductor and said second phase terminal of said first motor, means connecting the output winding means of said fifth inductor between said third conductor and said third phase terminal of said first motor, control means connected to supply current of one polarity through said first input winding means of said fifth inductor and said first input winding means of said first, second, third and fourth inductors and current of the opposite polarity through said second input winding means of said fifth inductor and first input winding means of said first, second, third and fourth inductors, sixth, seventh, eighth, ninth and tenth inductors, each of said last-named inductors having output winding means, first input winding means and second input winding means, means connecting the output winding means of the sixth inductor between the first conductor and the first phase terminal of said second motor, means connecting the output winding means of the seventh inductor between said second conductor and said second phase terminal of said second motor, means connecting said output winding means of said eighth inductor between said first conductor and said second phase terminal of said second motor, means connecting said output winding means of said ninth inductor between said second conductor and said first phase terminal of said second motor, means connecting the output winding means of said tenth inductor between said third inductor and the third phase terminal of said motor, control means connected to supply current of one polarity through said first input winding means of said tenth inductor and through the first input winding means of the sixth, seventh, eighth and ninth inductors and of the opposite polarity through the second input winding means of said tenth inductor and through the first input winding means of said sixth, seventh, eighth and ninth inductors, and means responsive to the difference in speed between said first motor and said second motor for supplying control current through said second winding means of said first, second, third, and fourth and sixth, seventh, eighth and ninth inductors in such a sense as to compensate for said difference in speed.

6. Apparatus for controlling the supply of power from a three phase source having first, second and third phase conductors to a three phase motor having first, second and third phase terminals, comprising in combination first, second, third, fourth and fifth inductors, each of said inductors having output winding means, first input winding means, and second input winding means, means connecting the output winding means of the first inductor between said first conductor and the first phase terminal of said motor, means connecting said output winding means of said second inductor between said second conductor and said second phase terminal of said motor, means connecting said output winding means of said third inductor between said first conductor and said second phase terminal of said motor, means connecting said output winding means of said fourth inductor between said second conductor and said second phase terminal of said motor, means connecting the output winding means of said fifth inductor between said third conductor and said third phase terminal of said motor, first control means connected to supply current of one polarity through said first input winding means of said fifth inductor and said first input winding means of said first, second, third and fourth inductors and current of the opposite polarity through said second input winding means of said fifth inductor and first input winding means of said first, second, third and fourth inductors, and second control means for supplying control current through said second input winding means of said first, second, third, and fourth inductors.

7. Apparatus for controlling a polyphase motor having first, second and third terminals, from first, second and third supply conductors of a polyphase source comprising in combination a first inductor, a second inductor, a third inductor, a fourth inductor, each of said inductors having output winding means and control winding means, means connecting in series said first conductor, said output winding means of said first inductor and said first terminal, means connecting in series said first conductor, said output winding means of said second inductor and said second terminal, means connecting in series said second conductor, said output winding means of said third inductor and said second terminal, means connecting in series said second conductor, said output winding means of said fourth inductor and said first terminal, control means for said control winding means connected to said control winding means and operative to vary the impedances of the first and third inductors in opposite sense to said second and fourth inductors, and means connecting said third conductor to said third terminal, the said apparatus being characterized by means connecting said third conductor to said third terminal which includes a single inductor having output winding means, first control winding means and second control winding means, said output winding means being connected between the third conductor and the third terminal, said first control winding means being connected to the control means so as to cause the impedance of said single inductor to vary with the impedance of the first and third inductors, and said second control winding means being connected to said control means so as to cause said impedance of said single inductor to vary with the impedance of the second and fourth inductors, and said control means including current supply means capable of supplying current of either polarity, means connecting said current supply means to supply current, of a polarity such as to vary the impedance of said first and third inductors, through the control winding means of said first and third inductors and through the first control winding means, and means connecting said current supply means to supply current, of the opposite polarity such as to vary the impedance of said second and fourth inductors, through the control winding means of the second and fourth inductors and through the second control winding means.

8. Apparatus for controlling a first three-phase motor and a second three-phase motor from a three-phase supply, each of said motors having low-resistance rotor circuits, comprising in combination, first inductor means connected in phase balanced relationship between said supply and said first motor, second inductor means connected in phase balanced relationship between said supply and said second motor, said first and second inductor means having control winding means, a differential mechanism responsive to the difference in speeds of said motors and means responsive to said mechanism for supplying current to said control winding means in accordance with the difference in speed of said motors, said control winding means for both inductor means being supplied with the current in series.

9. Apparatus for controlling a first three-phase motor and a second three-phase motor from a three-phase supply, each of said motors having low resistance rotor circuits, comprising in combination, first inductor means connected in phase balanced relationship between said supply and said first motor, second inductor means connected in phase balanced relationship between said supply and said second motor, said first and second inductor means having control winding means, a differential mechanism responsive to the difference in speeds of said motors and means responsive to said mechanism for supplying current to said control winding means in accordance with the difference in speed of said motors, said control winding means of said inductor means being initially supplied with potential such that the initial break away torque of each of said motors is of the order of 250% rated torque.

References Cited in the file of this patent

UNITED STATES PATENTS

| | | |
|---|---|---|
| 2,683,846 | Carnegie et al. | July 13, 1954 |
| 2,695,982 | Soller et al. | Nov. 30, 1954 |
| 2,709,774 | Wells | May 31, 1955 |
| 2,712,105 | Mathias et al. | June 28, 1955 |
| 2,725,511 | Jacobs | Nov. 29, 1955 |
| 2,734,157 | McKenney et al. | Feb. 7, 1956 |